June 13, 1972 D. L. FULLER 3,669,527
WIDE ANGLE PHOTOGRAPHIC OBJECTIVE HAVING NONSPHERICAL SURFACES
Filed Dec. 3, 1970 2 Sheets-Sheet 1

INVENTOR
DAVID L. FULLER
BY Newton, Hopkins, & Grimsby
ATTORNEYS

June 13, 1972  D. L. FULLER  3,669,527
WIDE ANGLE PHOTOGRAPHIC OBJECTIVE HAVING NONSPHERICAL SURFACES
Filed Dec. 3, 1970  2 Sheets-Sheet 2

United States Patent Office 3,669,527
Patented June 13, 1972

3,669,527
WIDE ANGLE PHOTOGRAPHIC OBJECTIVE HAVING NONSPHERICAL SURFACES
David L. Fuller, Atlanta, Ga., assignor to Scripto, Inc., Atlanta, Ga.
Filed Dec. 3, 1970, Ser. No. 94,830
Int. Cl. G02b 13/18
U.S. Cl. 350—189                                11 Claims

ABSTRACT OF THE DISCLOSURE

A wide angle photographic objective is disclosed using lens elements whose surfaces are axially symmetrical in the vertical plane to define an axi-symmetric optical system and whose surfaces are concentric in the horizontal plane about a common axis of revolution to define a concentric optical system. Excellent correction of spherical aberration is attained for the axial system by the use of an aspheric front surface for the objective and correction for spherical aberration for the concentric system is contributed largely by separate lens means. Substantially cylindrical tangential and sagittal images for the objective with little residual astigmatism is also achieved by the use of a specially constructed lens group which also contributes substantially to correction for lateral color in the axi-symmetric system.

BACKGROUND OF THE INVENTION

My prior Patents 3,251,266 and 3,361,512 disclose wide angle photographic objectives having nonspherical surfaces. Both objectives are so constructed as to produce a cylindrical image concentric about a vertical axis and in which all of the lens surfaces are concentric with respect to this vertical axis in planes perpendicular thereto, and in which all of said lens surfaces are symmetrical with respect to a horizontal axis which is perpendicular to the vertical axis and to the image. In this way, each objective is characterized by the fact that its lens surfaces define two optical systems, one of which is a concentric system and the other of which is an axi-symmetric system. In other words, each objective incorporates two optical systems in one, and these systems are constructed to be essential parfocal at the image plane so as to produce an image that is congruent with respect to the object and in which the systems are well corrected optically.

Each patent further discloses primary and secondary apertures associated with the concentric and axi-symmetric systems respectively, which apertures not only contribute individually to the states of correction, particularly for spherical aberration, in the respective systems by vignetting undesirable oblique rays, but which may be balanced also with respect to each other so as to provide for even illumination throughout the image plane.

Of principal concern in each patent is the means by which the image may be made essentially cylindrical so that it is generally flat in the vertical meridian whereby astigmatism is well corrected throughout the image. In my earlier patent, variations in the radius of the front surface of the objective with respect to the concentric system are made so as to vary the focal length of the concentric system independently of that of the axi-symmetric system so as to achieve the aforementioned parfocality. That is to say, the foci of the concentric system may be shifted with respect to the foci for the axi-symmetric system without significant change in the inherent curvature of either so as to attain a reasonable degree of residual astigmatism throughout the image. In my later patent, this concept is used in conjunction with means for controlling the curvature of the image for the axi-symmetric system whereby increased flattening of this image and consequent reduction in residual astigmatism is achieved.

SUMMARY OF THE INVENTION

The present invention is directed to improvements in the optical systems above described generally with respect to my earlier patents, and is directed in particular to the achievement of still higher states of correction for spherical aberration and astigmatism throughout the system.

Essentially, the improvements according to the present invention are achieved by providing a wide angle photographic objective of the above general characteristics with respect to the incorporation of concentric and axi-symmetric systems wherein the front lens element of the objective is provided with a front surface which is aspherized with respect to the axi-symmetric system to correct spherical aberration with respect to the axi-symmetric system and wherein functionally separate lens means is provided for achieving a high-state of correction for spherical aberration with respect to the concentric system.

The lens means which contributes this high state of correction for spherical aberration in the concentric system involves lens surfaces of respectively positive and negative curvatures and of substantially equal radii with respect to the concentric axis, the glass from which this portion of the lens system is made being characterized by a low index of refraction and high reciprocal dispersion and wherein such portion of the system is provided to the front and to the rear thereof with lens elements having high indices of refraction and low reciprocal dispersions. This relationship also allows the front lens of this portion of the system to be constructed as a cemented doublet wherein the rear element of this doublet, having the high index refraction and low reciprocal dispersion hereinbefore mentioned, has a front surface of negative curvature for the axi-symmetric system which is cemented to the rear surface of the front element of the doublet, which front element is of lesser index of refraction and higher reciprocal dispersion so that this doublet may be utilized to provide a high state of correction for lateral color in the axi-symmetric system for the objective. The rear lens may also be of doublet form to obtain greater control of longitudinal and lateral color for the axi-symmetric system.

DETAILED DESCRIPTION OF THE INVENTION

Figure 1:
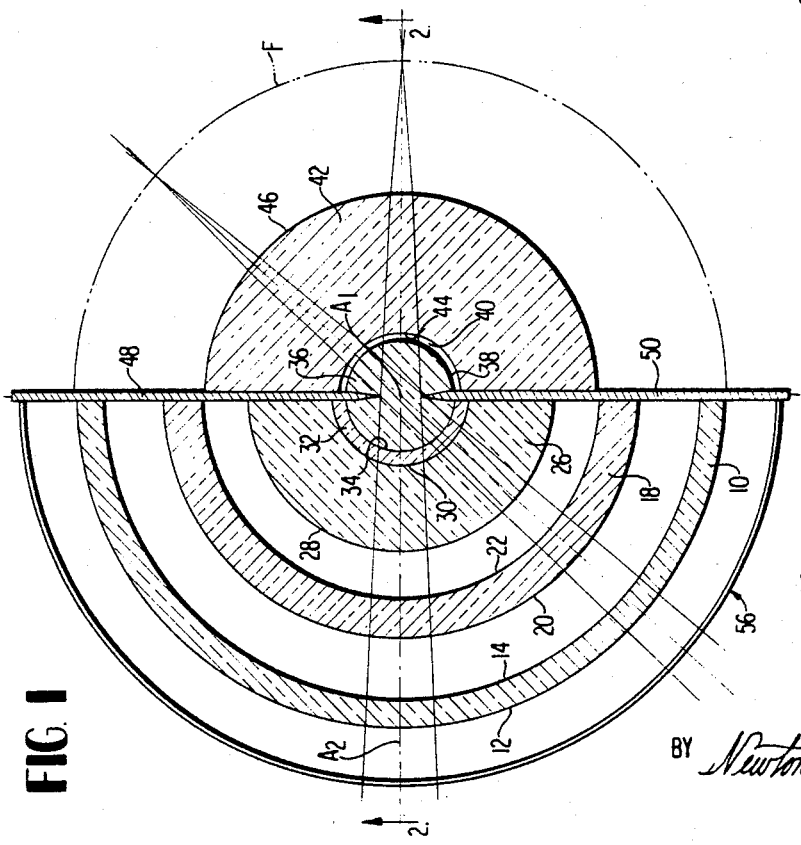
FIG. 1 is a horizontal section showing details of the concentric optical system.

Referring now more particularly to FIG. 1 wherein the details of the objective with respect to the concentric system are shown, it will be seen that the objective embodies a front lens element designated by the reference character 10 which has front and rear surfaces 12 and 14 both of positive curvature as shown for the concentric system, this front lens being spaced by the air gap 16 in front of the secondary front lens 18. The lens element 18 presents front and rear surfaces 20 and 22 having positive curvatures and this lens element in turn is spaced by the air gap 25 from the lens element 26 which presents a front surface 28 of positive curvature. The lens element 26 has its rear surface 30 cemented to the front surface of the lens element 32, the inner surface being of positive curvature for the concentric system as shown and the rear surface 34 is likewise of positive curvature.

The rear surface 34 of the lens element 32 is cemented to the front surface of the central lens means 36 which, for the objective shown in FIG. 1, is illustrated to be a single lens element although as hereinafter described it is contemplated to split this lens means into separate components. In any event, the central lens portion is characterized by the fact that it is centered about the concentric axis $A_1$ so that its front surface as defined at the interface 34 and its rear surface 38 are of equal radii and are respectively of positive and negative curvatures. The central lens means 36 is followed by a small air gap 40 and the objective is then completed by the rear lens element 42 having a front surface 44 defining the aforementioned air gap 40. The front surface 44 is of negative curvature for the concentric system and the rear lens element presents also the rear surface 46 having negative curvative for the concentric system.

The image produced by the objective is cylindrical, having its curvature centered about the concentric axis $A_1$ which is indicated by the reference character F in FIG. 1. In addition to lens components described hereinabove with respect to the concentric system, such concentric system is also provided with a primary aperture or stop defined by the opaque members 48 and 50 whose inner edges at 52 and 54 define a gap presenting the primary aperture or stop for the system. A secondary aperture is located in the region indicated generally by the character 56 hereinafter more particularly described with respect to the axi-symmetric system as shown in FIG. 2.

Figure 2:
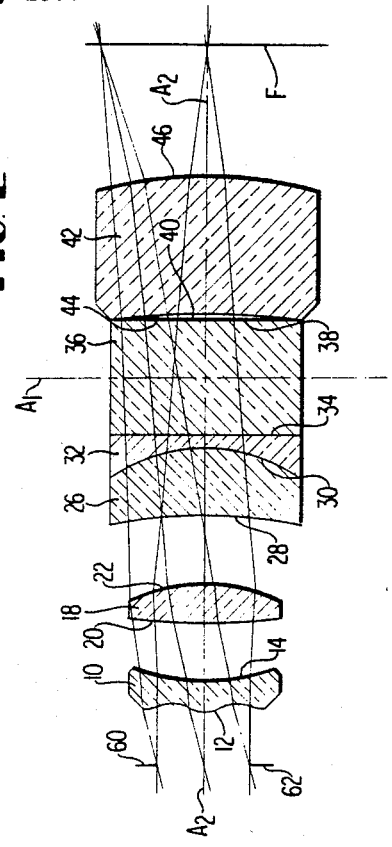
FIG. 2 is a vertical section showing details of the axi-symmetric optical system.

Referring now more particularly in FIG. 2 wherein the details of the axi-symmetric system are shown, it will be seen that the front surface 12 of the front lens 10 is aspherized with respect to the axi-symmetric system, the purpose of this being to contribute substantially to correction for spherical aberration in the axi-symmetric system. In my copending application Ser. No. 187,605, filed Oct. 8, 1971, and entitled "Method of Producing Toric Lens Elements With Aspheric Surfaces" means is disclosed whereby a fourth order aspheric surface may be generated easily. Although not restricted to aspheric surface generation as disclosed in such copending application, it is preferred that the curvature of the front surface 12 be generated in the fashion disclosed in my copending application.

As disclosed in my copending application, the generation of a fourth order curve is a relatively simple matter utilizing the techniques therein. In the data table which hereinafter follows, the shape of this surface 12 in the axi-symmetric system is given in terms of a base curve plus a fourth order deformation coefficient which refers to the equation $Z = $(base curve)$ + BY^4$ wherein Z represents the distance along the axis $A_2$ in FIG. 2 from the vertex of the surface 12, Y is the height above this axis, and the term $BY^4$ represents the fourth order deformation of the base curve where the term B is the fourth order aspheric coefficient given; positive values of the term Z being taken from the vertex toward the image plane and negative values being taken in the direction from the vertex toward the object.

The rear surface 14 of the front lens 10 is of positive curvature for the axi-symmetric system and the front surface 20 of the secondary front lens 18 is also slightly positive, the rear surface 22 of this lens being negative so that the lens element 18 is a strongly positive element for the axi-symmetric system. The front surface 28 of the front lens 26 of the doublet 26, 32 is slightly negative for the axi-symmetric system and the inner surface 30 is likewise negative, the rear inner surface 34 of the doublet where it is cemented to the lens 36 having its radius at infinity as is the case for the rear surface 38 of the lens element 36 for the axi-symmetric system. The front surface 44 of the rear lens element 42 is slightly negative for the axi-symmetric system and is immediately behind the element 36 and in top and bottom edge contact therewith to define the air gap 40, the rear surface 46 of the rear lens elements 42 also being negative for the axi-symmetric system.

To appreciate the significance of the air gap 40, it is convenient to distinguish the two optical systems involved by referring to vertical and horizontal meridians, the former being with respect to meridians of the nature of FIG. 2 and the latter being with respect to meridians of the nature of FIG. 1. Thus, vertical meridians are with respect to the axi-symmetric system while horizontal meridians are with respect to the concentric system. For further convenience in describing astigmatism, tangential fans will be considered as vertical fans taken with respect to the axi-symmetric system while sagittal fans will be considered as taken with respect to the concentric system.

It will be noted that unlike more conventional, spherical systems or those having but a single axis of symmetry wherein astigmatism does not exist for object points along the axis, this aberration may exist for any object point in the present system. Far from being a disadvantage, this characteristic of the present objective is used to advantage, for it is this characteristic which allows the tangential and sagittal images to be made essentially parallel so that they may be brought into closer conformity, thereby reducing astigmatism, by shifting the locus of sagittal foci without significantly affecting the locus of tangential foci.

One further point to be considered is the nature of the image required as necessitated by the physical characteristics of the photographic film. This has to do with the fact that the photographic film may be made to conform easily to curvature in the longitudinal direction but will lie flat in the transverse direction as a result. This, of course, refers to the arcuate and flat images depicted respectively in FIGS. 1 and 2, i.e., the photographic film being exposed is in the shape of a portion of a cylinder.

Thus, it is of interest that the objective provide a cylindrical image to achieve reasonably flat tangential and sagittal images in vertical meridians so that the photographic film will be sharply in focus throughout the field and so that the residual astigmatism may be minimized.

The air gap 40 is of extreme importance in connection with controlling the shape of the sagittal image, that image contribution associated with the concentric system. FIG. 2 is a cross section of the objective taken at the major concentric meridian. It will be understood that air gap 40 contributes a smaller relative amount of negative power to the system in the plane of FIG. 2 than would be possible in planes both above and below said plane. Furthermore, it can be seen that sagittal fans traversing the system at various entry angles are directed through increasingly narrower portions of said air gap 40, until at the upper and lower limits of the field there is practically no gap at all. The resultant effect is to move the off axis sagittal focal points rearwardly by an amount calculated to place each in near proximity to the desired cylindrical image shape.

There is no special device needed to assure a satisfactory tangential image, as in the case of the sagittal image. In general, this part of the design is no problem and is handled by well known calculating methods. It should be pointed out that with this type of system there is no apparent relationship nor conventional interaction between the tangential and sagittal images; that is, the shape of one does not affect the shape of the other.

Figure 3:
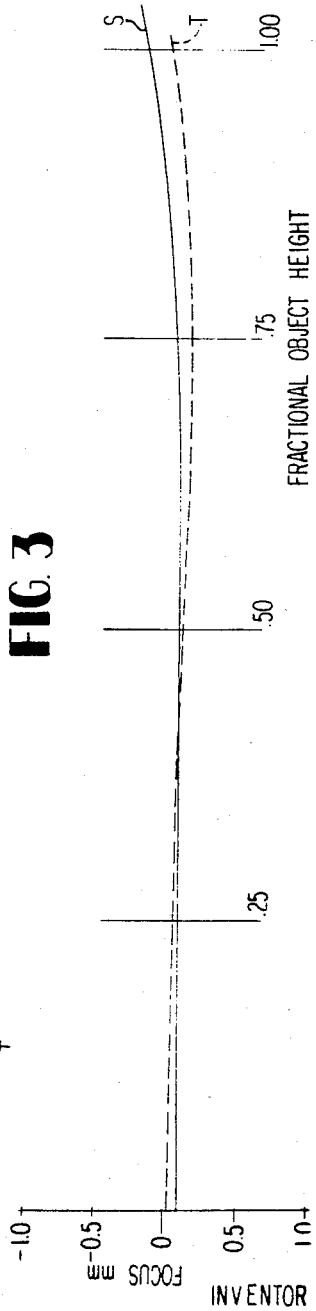
FIG. 3 is a graph illustrating the tangential and sagittal images.

Residual astigmatism in the system can be further reduced by shifting the sagittal image with respect to the tangential image such that there is introduced a small amount of axial astigmatism, thereby creating an optimum relationship in terms of having the best overall image quality possible. This is illustrated in FIG. 3, wherein S refers to the sagittal image and T denotes the tangential image. This shifting of images always comes near the end of the design and is achieved any number of obvious ways.

FIG. 2 also shows the members 60 and 62 which define the secondary aperture as illustrated and the purpose of which is identical to that described in conjunction with my prior patents. It will be also understood that the primary and secondary apertures may be shaped as described in my prior patents so as to assure substantially even illumination throughout the image.

Figure 4:
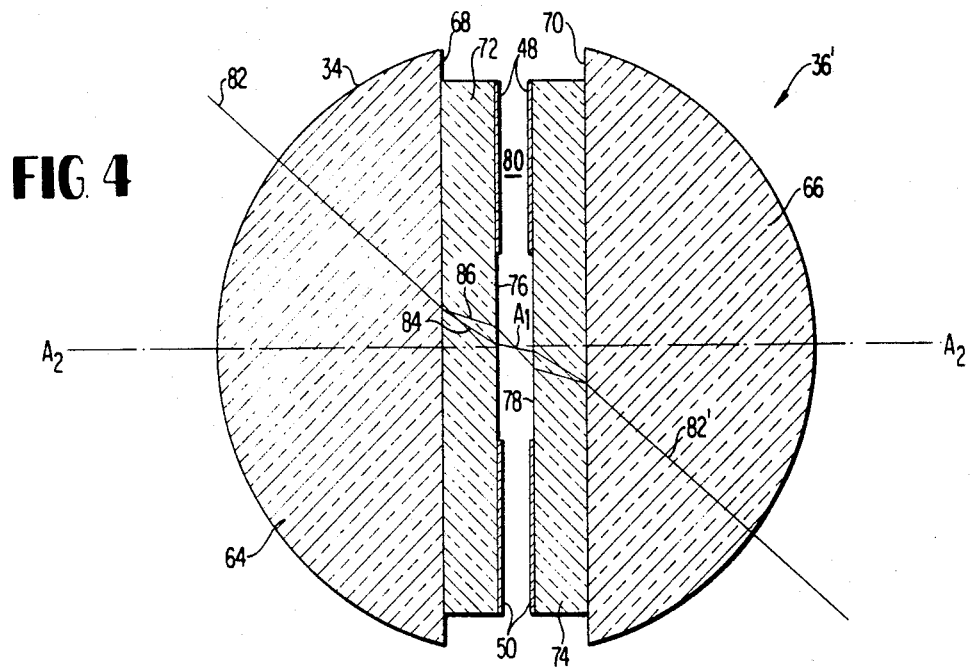
FIG. 4 is a view showing a modified portion of the objective.

FIG. 4 illustrates a modified form of the invention wherein a between-the-lens shutter is utilized. This type of shutter is desired in order to enable high shutter speed to be achieved and the benefit of placing the shutter in the position shown is to accommodate it within a region in which the physical dimensions of the aperture are relatively small so that the shutter components correspondingly may be made relatively small to enable the high-speed operation to be obtained without undue inertia loading, etc. Moreover, for a camera used in an aircraft traveling at high speed and at relatively low altitude, the problem of degradation of the image by a shutter of large aperture size is minimized.

In FIG. 4, the central lens 36' which corresponds to the lens 36 of FIGS. 1 and 2 will be seen to have been split into two components, a front component 64 and a rear component 66 presenting the aforementioned front and rear surfaces 34 and 38. The rear surface 68 of the front portion 64 is planar as is the front surface 70 of the rear portion 66, and they are separated by a spacing of approximately 0.200 inch. Cemented to the rear surface 68 is an optical glass plate 72 and cemented to the front surface 70 of the rear portion 66 is an optical glass plate 74, the respective opposing surfaces 76 and 78 of these plates being planar and in parallel relationship separated by a spacing of approximately 0.040 inch to accommodate the shutter assembly therebetween. This space designated by the reference character 80 is filled with a liquid for compatible index of refraction and reciprocal dispersion with respect to the remainder of this lens component as will hereinafter be described.

The front and rear portions 64 and 66 are of the same optical glass having relatively low indices of refraction and relatively high reciprocal dispersions; the plates 72 and 74 are of slightly less indices of refraction and somewhat greater reciprocal dispersion with respect to the front and rear portions 64 and 66, and the liquid filling the space 80 is of slightly higher index of refraction than are the front and rear portions 64 and 66 but is characterized by a somewhat lower reciprocal dispersion. To give a specific example, the glass for the portions 64 and 66 has an index of refraction of 1.573 and a reciprocal dispersion of 57.5; plates 72 and 74 have an index of refraction of 1.569 and a reciprocal dispersion of 63.1 and the liquid filling the space 80 is α-dibromomethylbenzene having an index of refraction of 1.578 and a reciprocal dispersion of 32.0.

The effect of these relationships is shown in FIG. 4 wherein the oblique ray 82 is shown as splitting for the C and F lines respectively into the two rays 86 and 84 within the plate 72 with these rays crossing back over each other within the liquid in the space 80 and then converging within the plate 74 to join and exit in the ray 82'. Thus the arrangement is such as to avoid degradation of the image by the implementation of the between-the-lens shutter. The details of the shutter assembly are disclosed in my copending application Ser. No. 187,722, filed Oct. 8, 1971, and entitled "Shutter Assembly for Photographic Equipment."

As a specific example, a system incorporating the principles of the present invention and with reference to the lens system shown in FIGS. 1 and 2, the following table is given:

LENS TABLE

| Lens | Thickness | Radius Fig. 1 | Radius Fig. 2 | Air spacing | Index | Abbe No. |
|---|---|---|---|---|---|---|
| 10 | 9.565 | $R_{12}=100.873$ | $401.478+BY^4$; $B=-2.592\times10^{-6}$ | | 1.6223 | 53.1 |
| | | $R_{14}=91.306$ | 91.349 | 17.935 | | |
| 18 | 10.870 | $R_{20}=73.372$ | 239.432 | | 1.6204 | 60.3 |
| | | $R_{22}=62.502$ | −49.087 | 15.973 | | |
| 26 | 25.875 | $R_{28}=46.528$ | −382.859 | | 1.6204 | 60.3 |
| | | $R_{30}=20.653$ | −51.632 | | | |
| 32 | 3.261 | $R_{34}=17.392$ | ∞ | | 1.7408 | 27.7 |
| 36 | 34.784 | $R_{38}=-17.392$ | ∞ | | 1.5725 | 57.5 |
| | | | | 0.543 | | |
| 42 | 41.848 | $R_{44}=-17.935$ | −583.237 | | 1.7234 | 38.0 |
| | | $R_{46}=-59.784$ | −164.038 | | | |

In the above table, all dimensions are in millimeters, the stop 56 is spaced 18.372 mm. in front of the lens 10 and the image surface is spaced 40.216 mm., rearwardly from the lens 42. For an object at infinity, $f=100$ mm., relative aperture $f/4.5$, field 150° x 38°.

Figure 5:
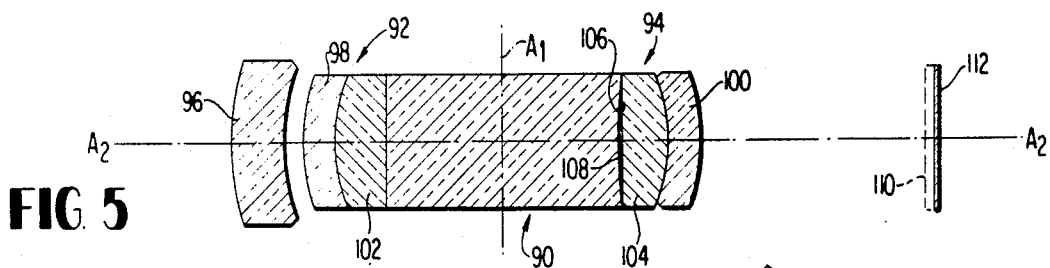
FIG. 5 is a view similar to FIG. 2 but showing a modified objective.
Figure 6:
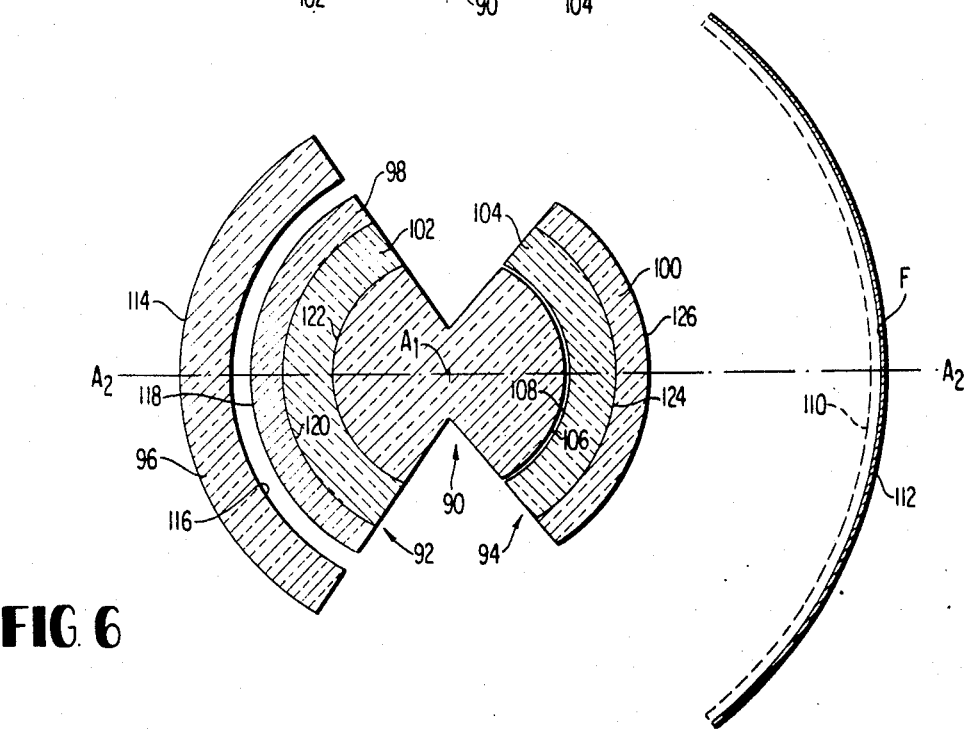
FIG. 6 is a view similar to FIG. 2 but relating to the modification of FIG. 5.

A further modification of the invention is illustrated in FIGS. 5 and 6 wherein it will be seen that the central lens means 90 is associated with the front and rear doublets 92 and 94 shown clearly in FIG. 5. The lens group 90, 92 and 94 forms the rear lens means of the system which is proceeded by the front lens 96. For the vertical meridian as shown in FIG. 5, the doublets 92 and 94 are arranged symmetrically about the axis $A_1$ to provide more adequate control of lateral and longitudinal color in this meridian and, in general, the outer lenses 98 and 100 of these doublets will have low reciprocal dispersions while the inner lens elements 102 and 104 will have higher reciprocal dispersions. The rear surface 106 of the central lens 90 is provided with positive curvature in contrast to the system described in conjunction with FIGS. 1 and 2, whereas the surface 108 has essentially zero curvature. In this way, more precise control of sagittal field curvature and sagittal coma is obtained whereas the air gap between these surfaces 106 and 108 is still maintained to achieve control of aberrations as mentioned hereinbefore. This air gap continues to contribute a net negative power effect in the vertical meridian.

The front lens 96 has low net power and is primarily used to trim out the residual spherical and comatic aberrations as well as the tangential component of field curvature, all with respect to the vertical meridian and in calculating these corrective factors it may be necessary to split the front lens element 96 into two or more elements. The use of several high index glasses makes it practical to use shallow curves in the vertical meridian which has the overall beneficial effect of reducing the magnitude and therefore the correctional problems associated with certain aberrations. In other words, it reduces residuals, thereby enabling an increase of speed to be realized for a given focal length.

For the horizontal meridian shown in FIG. 6, the general principle of providing a low index-high reciprocal dispersion core or center lens 90 surrounded by high index, low reciprocal dispersion material for the purpose of correcting simultaneously for spherical aberration and longitudinal color in this meridian is followed. In the objective shown, an increase in relative aperture is gained by increasing the concentric radii of the central lens means 90 in relation to the equivalent focal length of the system, thus effectively reducing the positive fifth order spherical aberration component with respect to the exit slope angle for paraxial rays entering the system. This fifth order component is otherwise largely uncorrectable when it occurs in the system. The reciprocal dispersion of the front lens 96 is varied to trim out longitudinal color in the concentric system.

From FIG. 6, it will be noted that diametrically opposed sectors are cut away to produce a lens which is both compact and of very light weight.

One further feature which may be utilized in conjunction with the present invention is illustrated in FIGS. 5 and 6 where it will be seen to consist of the focal surface element 110 against which the film strip 112 is applied. The element 110 is optional but may be added where it is deemed necessary to have means to position the film 112 in very accurate registry with the lens as is the case of a high resolution system. When introducing such an element, its effect, though small, must be taken into account when calculating the major elements 90, 92, 94 and 96 of the system. The simplest form for the element 110 will incorporate zero curvature services reference to the vertical meridian and wherein such element would be relatively thin. If the situation should warrant, however, the front or inner surfaces of this lens could be configured to make a larger contribution in the case of correction of systemwide aberrations, such as field curvature. In addition, the rear surface of element 110 could be accurately shaped to the exact optimum position of the focal surface, whereupon it might be possible, within reason, to use a thin base film 112 and to stretch such film so as to cause it to conform exactly to the rear surface of the element 110 during exposure.

In the system according to FIGS. 5 and 6, the front surfaces of the lenses 96 and/or 98 and/or the rear surface of the lens 100 may be altered to provide some fourth and/or sixth order aspherizing of these surfaces so as to reduce residual aberrations.

An exemplary system constructed according to the principles of FIGS. 5 and 6 is indicated as follows, wherein all dimensions are given in inches: $f=3.0$ inches; relative aperture $=f/2.8$ and the field is 110° x 18°.

LENS TABLE

| Lens | Thickness | Radius Fig. 6 | Radius Fig. 5 | Air spacing | Index | Abbé No. |
|---|---|---|---|---|---|---|
| 96 | .340 | $R_{114}=1.840$ | 3.143 |  | 1.570 | 42.7 |
|  |  | $R_{116}=1.500$ | 2.950 | 0.150 |  |  |
| 98 | .200 | $R_{118}=1.350$ | B=2.800 |  | 1.805 | 25.5 |
| 102 | .350 | $R_{120}=1.150$ | 1.150 |  | 1.805 | 39.5 |
| 90 | 1.575 | $R_{122}=0.800$ | ∞ |  | 1.487 | 69.8 |
|  |  | $R_{106}=-0.775$ | 2.825 | 0.025 |  |  |
|  |  | $R_{109}=-0.800$ | ∞ |  |  |  |
| 104 | .350 | $R_{124}=-1.150$ | -1.150 |  | 1.805 | 42.3 |
| 100 | .200 | $R_{126}=-1.350$ | -2.800 |  | 1.805 | 25.5 |
|  |  |  |  | 1.650(To F) |  |  |

What is claimed:

1. A wide angle photographic objective having a cylindrical image and a first axis about which said image is concentric, and a second axis orthogonal to said first axis and perpendicular to said image, said objective having a plurality of lens surfaces all of which are concentric with respect to said first axis in a plane containing said second axis to define a concentric optical system, and all of which lens surfaces are symmetrical with respect to said second axis in a plane containing said first and second axes to define an axi-symmetric optical system, the improvement wherein said objective comprises;

front lens means having negative power for both of said optical system, wherein said front lens means includes a front aspherical surface with respect to the axi-symmetic system; and, rear lens means spaced from said front lens means for producing substantially cylindrical images for sagittal and tangential focii taken respectively with respect to said concentric optical system and with respect to said axi-symmetric system, said rear lens means including central lens means centered on said first axis and having front and rear surfaces of respectively positive and negative curvatures and substantially equal radii with respect to the concentric system, a doublet in front of said central lens means and further lens means presenting a further surface behind said rear surface of the central lens means, said rear surface of the central lens means and said further surface presenting an air space formed by curvature of at least one of said rear and further surfaces with respect to said axi-symmetric system such as introduces negative power, the optical material of said central lens means which provides said rear surface having a lower index of refraction and a higher reciprocal dispersion than the index of refraction and reciprocal dispersion of the optical material which provides said further surface.

2. The wide angle photographic objective as defined in claim 1 wherein said doublet is cemented to said front surface of the central lens means for correcting lateral color for the axi-symmetric system, the element of said doublet which is cemented to said central lens means being of higher index of refraction and lower reciprocal dispersion than said central lens means.

3. The wide angle photographic objective as defined in claim 2 wherein said further lens means is a cemented doublet.

4. The wide angle photographic objective according to claim 2 wherein said central lens means comprises front and rear elements having planar confronting faces separated from and parallel to each other, first and second plates cemented to said planar faces and presenting a clearance space therebetween for receiving a between-the-lens shutter, said plates having higher reciprocal dispersion than the front and rear elements and said clearance space being filled with liquid having lower reciprocal dispersion than said plates.

5. The wide angle photographic objective as defined in claim 1 wherein said doublet is cemented to said front surface of the central lens means for correcting lateral color for the axi-symmetric system, the element of said doublet which is cemented to said central lens means being of higher index of refraction and lower reciprocal dispersion than said central lens means.

6. The wide angle photographic objective according to claim 5 wherein said central lens means comprises front and rear elements having planar confronting faces separated from and parallel to each other, first and second plates cemented to said planar faces and presenting a clearance space therebetween for receiving a between-the-lens shutter, said plates having higher reciprocal dispersion than the front and rear elements and said clearance space being filled with liquid having lower reciprocal dispersion than said plates.

7. The wide angle photographic objective according to claim 5 wherein said further lens means is a cemented doublet.

8. A wide angle photographic objective having a cylindrical image and a first axis about which said image is concentric, and a second axis orthogonal to said first axis and perpendicular to said image, said objective having a plurality of lens surfaces all of which are concentric with respect to said first axis in a plane containing said second axis to define a concentric optical system in planes perpendicular to said first axis, and all of said lens surfaces being symmetrical with respect to said second axis in a plane containing said first and said second axes to define an axi-symmetric optical system in planes containing said first axis, the improvement wherein said objective includes;

a front lens element having a front surface which is aspherized for the axi-symmetric optical system to correct spherical aberration for such axi-symmetric optical system; and lens means separate from said front lens element for correcting spherical aberration for said concentric optical system.

9. The wide angle photographic objective as defined in claim 8 wherein said lens means comprises central lens means having front and rear surfaces of respectively positive and negative curvatures and whose radii are substantially identical with respect to the concentric system, said front and rear surfaces of said central lens means being planar with respect to the axi-symmetric system, said central lens means being constructed of optical material having a predetermined index of refraction and a predetermined reciprocal dispersion, said lens means also including a first lens in front of and in contact with said central lens and a second lens to the rear of said central lens, said first and said second lenses being constructed of optical materials having indices of refraction much greater than said predetermined index of refraction and of reciprocal dispersions much less than said predetermined reciprocal dispersion, said second lens having a front surface of negative curvature with respect to the axi-symmetric system to provide an air gap between such front surface and the rear surface of said central lens.

10. The wide angle photographic objective as defined in claim 9 wherein said first lens is a cemented doublet for correcting lateral color with respect to the axi-symmetric system.

11. The wide angle photographic objective according to claim 8 wherein said lens means comprises central lens means having front and rear surfaces of respectively positive and negative curvature and of substantially equal radii with respect to the concentric system, a front doublet and a rear doublet; said central lens means being constructed of optical material having predetermined index of refraction and predetermined reciprocal dispersion, the rear element of said front doublet and the front element of said rear doublet being constructed of optical materials having indices of refraction substantially greater than said predetermined index of refraction and reciprocal dispersions substantially less than said predetermined reciprocal dispersion; said rear surface of the central lens means and the opposing surface of said rear doublet presenting an air gap formed by curvature of at least one of such surfaces with respect to said axi-symmetric system, which air gap is of decreasing axial dimension for increasing height with respect to said second axis.

References Cited

UNITED STATES PATENTS

| | | | |
|---|---|---|---|
| 3,361,512 | 1/1968 | Fuller | 350—190 |
| 2,522,390 | 9/1950 | McCarthy | 350—189 |
| 3,362,770 | 1/1968 | Ross. | |

JOHN K. CORBIN, Primary Examiner

U.S. Cl. X.R.

350—175 SL, 190, 191